C. H. RICHARDS

May 30, 1933. CHANGE SPEED MECHANISM Re. 18,842

4 Sheets-Sheet 1

Original Filed Nov. 18, 1929

INVENTOR=
Carroll H. Richards,
BY Macleod, Calver, Copeland & Dike,
ATTYS.

May 30, 1933.

C. H. RICHARDS

CHANGE SPEED MECHANISM

Re. 18,842

Original Filed Nov. 18, 1929

4 Sheets-Sheet 2

INVENTOR=
Carroll H. Richards

BY Macleod, Calver, Copeland & Dike,

ATTYS.

May 30, 1933.

C. H. RICHARDS

CHANGE SPEED MECHANISM

Re. 18,842

Original Filed Nov. 18, 1929

4 Sheets-Sheet 3

INVENTOR=
Carroll H. Richards,

BY Macleod, Calver, Copeland & Dike,

ATTYS -

C. H. RICHARDS

May 30, 1933. CHANGE SPEED MECHANISM Re. 18,842

4 Sheets-Sheet 4

Original Filed Nov. 18, 1929

INVENTOR=
Carroll H. Richards,

BY Macleod, Calver, Copeland & Dike,

ATTYS.

Reissued May 30, 1933

Re. 18,842

UNITED STATES PATENT OFFICE

CARROLL H. RICHARDS, OF STOW, MASSACHUSETTS

CHANGE SPEED MECHANISM

Original No. 1,883,399, dated October 18, 1932, Serial No. 407,820, filed November 18, 1929. Application for reissue filed March 6, 1933. Serial No. 659,858.

This invention relates to change-speed mechanisms and particularly to such mechanisms as applied to motor vehicles and known as transmissions or gear sets.

Motor vehicle transmission now in common use require a manual shifting of gears to obtain the proper speed reduction. This shifting of gears is done by hand, thereby necessitating the removal of one hand from the steering wheel while the vehicle is in motion. Due to present day conditions of heavy traffic, especially in thickly congested areas, and the use of high speed motors with relatively faster pick-up or acceleration, it is essential for the operator to have complete control of the car at all times, and in so doing to have both hands on the steering wheel to meet any emergency, and not only make it safer for himself but to insure the safety of others.

Furthermore the present day transmissions are limited as to reductions, the operator of a motor vehicle having a choice of only a limited number of speeds which are approximate only in their performance besides requiring manual operation.

The particular object of the present invention is to provide a speed change mechanism which will be automatically controlled by the resistance encountered and permit the power to remain the same while the speed delivered is increased or decreased proportionally to the resistance. Such a construction would permit an engine to operate at its most efficient speed to deliver its maximum power while permitting the car to travel at maximum speed on each grade for the power developed.

While a device of this character is particularly adapted for use in motor vehicles, it may equally well be adapted for use in other machines where speed reductions are necessary, such as machine tools, gun turrets and the like.

The foregoing and other objects of the invention, together with means whereby the latter may be carried into effect, will best be understoood from the following description of the embodiment thereof illustrated in the accompanying drawings. It will be understood however that the particular construction and arrangement described and shown have been chosen for illustrative purposes merely, and that the invention as defined by the claims hereunto appended, may be embodied in numerous other forms without departure from the spirit and scope thereof.

In said drawings:

Fig. 9 shows two units similar to that shown in Fig. 8 coupled to form a single transmission.

Figure 1:
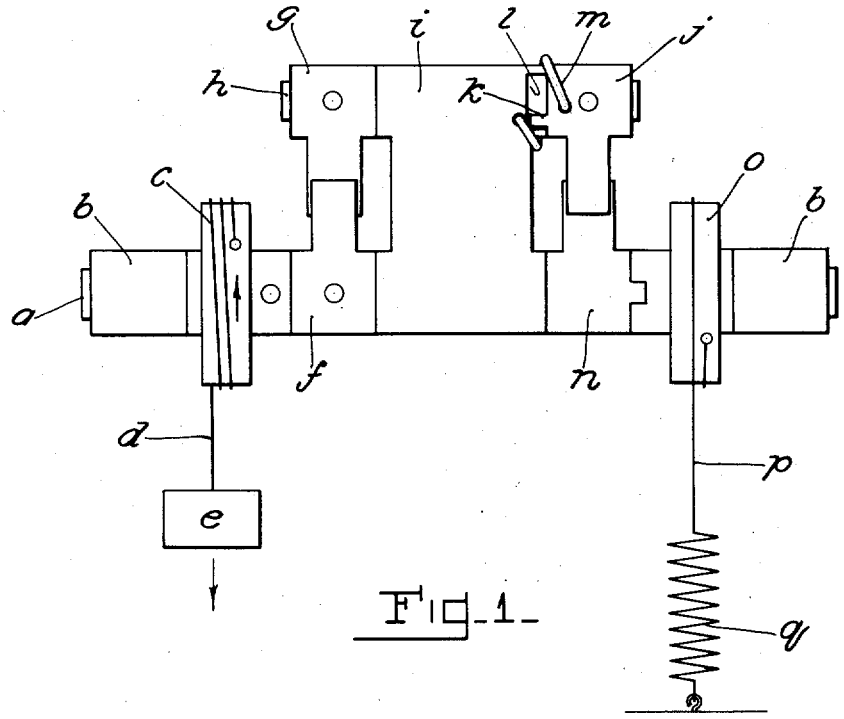
Fig. 1 is a diagram illustrating the operating principle of the invention in its high-speed condition.

One principle of the invention as applied to its high-speed condition is diagrammatically illustrated in Fig. 1 wherein *a* indicates a shaft journalled in fixed bearings *b*, *b*. A pulley *c*, secured to shaft *a*, has wound thereon a flexible connection *d* having attached to its free end a weight *e* representing the power applied to the system. Also secured to shaft *a* is an arm *f* which engages (in the manner shown) an arm *g* secured to one end of shaft *h* journaled in a rotary member *i* loosely mounted on shaft *a* and constituting an equalizer or differential element. Secured to the other end of shaft *h* is an arm *j* having a lug *k* which extends into a notch *l* formed in the rotary member *i*. This construction permits a movement of arm *j* relative to the member *i*, said arm being normally held in engagement with an arm *n*, hereinafter described, by a coiled spring *m* one end of which is attached to the member *i* and the other end of which is secured to the hub of the arm *j*. The arm $j$ engages (in the manner shown) the arm $n$ which is loosely mounted on the shaft $a$, said arm $n$ being locked to a pulley $o$ also loosely mounted on said shaft and preferably of the same diameter as pulley $c$. A flexible connection $p$ is wound around pulley $o$ in the opposite direction of the winding on pulley $c$, said connection having its free end attached to one end of a coiled spring $q$ (representing the resistance) the other end of which is fixed. The minimum tension of the spring $q$ is to be considered sufficient to overcome the inertia of the member $i$ if permitted to act independently thereon.

Assuming the weight $e$ (which constitutes the drive) to be exerting a pull in excess of the resistance offered by the spring $q$, the pulley $c$ will be rotated in the direction of the arrow thereon, causing shaft $a$ and arm $f$ to rotate in the same direction and impart the effort to arm $g$ due to the relation existing between the member $i$ and the spring $q$ as stated above, the arm $g$ tends to and does revolve the shaft $h$, and therefore the member $i$, bodily about the shaft $a$ as an axis. This action causes the arm $j$ to be revolved bodily about the same axis which in turn rotates the arm $n$ on the shaft $a$. The movement of the arm $n$, through the pulley $o$ and connection $p$, thus overcomes the resistance of the spring $q$. Since spring $q$ offers less resistance at this time than the pull of weight $e$, the arms $f$ and $g$ remain in engagement, as do also the arms $j$ and $n$, and the whole mechanism revolves as a unit at the same speed and in the same direction as the drive. This action continues until the tension of the spring $q$ becomes equal to the force of the drive, after which the forces become unbalanced, and the continued operation causes arm $j$ to be turned through a partial rotation in the same direction as the drive about the axis of the shaft $h$. This partial rotation of arm $j$ is transmitted through shaft $h$ to arm $g$ which causes said arm to be angularly advanced relative to the arm $f$, the action taking place about the point of contact between these parts as a fulcrum. This causes the member $i$ to rotate momentarily at a faster rate of speed than the drive, which condition has been brought about by the drive assisted by the interaction of the parts as above described. This action interrupts the driving engagement between the arm $j$ and the arm $n$, at which time the recoil of spring $q$ rotates pulley $o$ and arm $n$ in the opposite direction to the drive. Furthermore, after the interruption of the driving engagement between the arms $j$ and $n$, the spring $m$ causes arms $j$ and $g$ to return to their normal positions, their movement in this direction being limited by the end of the notch $l$. Arm $j$ again resumes its driving engagement with arm $n$, and, since the tension of spring $q$ has been decreased in the interim, the whole mechanism revolves again as a unit until the tension of the spring $q$ again substantially equals the force of the drive when the above described action is repeated. The action above described is similar to that of a device embodying the present invention up to the point where the high-speed mechanism ceases to function as the drive.

Figure 2:
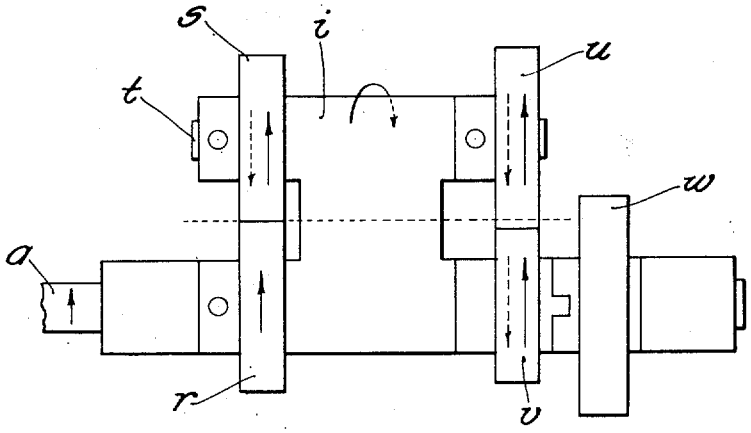
Fig. 2 is a diagram illustrating the operating principle in its low-speed condition.

Fig. 2 is a diagram illustrating another principle of the invention as applied to its low speed condition, which comprises an infinite number of speeds lower than the high speed. It must be understood that this part of the mechanism only functions in the operation of the device when the high-speed portion ceases to function. In this figure, the shaft $a$ has secured thereto a friction wheel $r$ which engages a friction wheel $s$ secured to one end of a shaft $t$ journaled in rotary member $i$ which is loosely mounted on shaft $a$. Attached to the other end of shaft $t$ is a friction wheel $u$ which engages a friction wheel $v$ loose on shaft $a$. Locked to friction wheel $v$, and loosely mounted on shaft $a$, is wheel $w$ which receives the resistance to the drive. Friction wheels $r$ and $s$ are preferably of the same diameter while friction wheel $u$ is of a greater diameter than friction wheel $v$.

The mechanism shown in this diagram is for the purpose of permitting a description which will afford a clearer understanding of the lower range of speeds and bring out more clearly a so-called "slipping clutch" operation of the device. In the operation of this portion of the device it must be understood that the resistance to the drive is greater than the driving effort. Under these conditions the member $i$ is rotating faster than the drive as was explained with reference to Fig. 1. Friction wheel $r$, which is rotated by the drive in a counterclockwise direction as viewed from the left, tends to drive friction wheel $s$ in a clockwise direction, and friction wheel $s$ through shaft $t$ tends to drive friction wheel $u$ in a clockwise direction as indicated by the dotted arrows on said wheels. Friction wheel $u$ tends to drive friction wheel $v$ in a counterclockwise direction, as indicated by the full-line arrow thereon. The resistance to the drive transmitted through the friction wheel $v$ tends to prevent the friction wheels $u$ and $s$ from rotating in a clockwise direction indicated by the dotted arrows thereon.

We may assume the resistance in the wheel $v$ to be great enough to hold it stationary, and the wheel $r$ to rotate. As wheel $v$ is of less diameter than wheel $u$, the tendency will be for member $i$ to revolve in the same direction as wheel $r$. The result is that the friction wheels $s$ and $u$ together with the member $i$ revolve bodily in a counter-clockwise direction about the shaft $a$, as indicated by the arrow on member $i$. Due to the resisting effort being greater than the driving effort wheels $s$ and $u$ will be rotated on their common axis, thus further increasing the speed of the member $i$ and causing it to travel at a faster rate of speed than the drive. Member $i$ rotating faster than the drive carries friction wheels $s$ and $u$ over friction wheels $r$ and $v$ and this tends to and does pull friction wheel $v$ along with member $i$, and the action of friction wheel $u$ over friction wheel $v$ is similar to that of a slipping clutch.

It is obvious that as the speed of friction wheel $v$ decreases, the speed of member $i$ increases and, as was previously stated when this part of the mechanism is functioning, member $i$ rotates faster than the drive, and as the resistance to the drive slows down the follower or wheel $v$ the differential in speed between member $i$ and the drive increases.

In the ordinary transmission, when it is operating in the lower speeds, the force of the drive is increased by a smaller gear driving a larger one which transmits its force to the follower. This smaller gear driving a larger one gives the drive a greater leverage over the follower or in other words a mechanical advantage. But when the resistance to the drive is overcome by a slipping clutch, the force of the drive is not increased, but remains the same, and the follower is driven at a slower speed, at which speed the driving force is able to overcome such a resistance. The mechanism just described acts in a similar manner to a "slipping clutch" in that the force of the drive is not increased by a definite leverage, such as a small gear driving a larger one, but permits the force of the drive to drive the follower at a slower speed than the drive.

The difference between the performance of a "slipping clutch" and the device herein described is that the "slipping clutch" delivers substantially the entire force of the drive to the follower, while with the present device not quite all the driving force is delivered, it being estimated that practically 95% of the driving force may be delivered to the follower, this being due to the necessity of designing this mechanism so that slower speeds may be had automatically. This difference of force is a sacrifice to secure the automatic relation—and the following is a description of how this difference occurs:

It was previously stated that member $i$ was rotating faster than the drive, but that friction wheel $r$ was driving the mechanism. Since member $i$ is rotating faster than friction wheel $r$, and therefore friction wheel $s$ is rotating on its axis in the opposite direction to that in which friction wheel $r$ tends to drive it, the force of the drive is transmitted through friction wheel $s$, shaft $t$, rotary member $i$ and friction wheel $u$ to friction wheel $v$ which receives the resistance to the drive. This force, at the periphery of wheel $v$, is theoretically equal to the driving force at the periphery of wheel $r$ times the radius of wheel $v$ divided by the radius of wheel $r$ (friction not considered).

For example let $$x = \text{radius of wheel } r$$

$$y = \text{radius of wheel } v$$

$$z = \text{force of drive.}$$

Then the force of the drive applied against its resistance is $$z\frac{y}{x}.$$

But the diameter of wheel $v$ must be smaller than the diameter of wheel $u$ in order to produce the infinite number of speeds lower than the high speed.

Now assume wheels $r$ and $s$ to be of equal radius and the radius of wheel $v$ to be $\frac{2}{3}$ of the radius of wheel $u$ and let $\theta$ equal the distance between the centers of shafts $a$ and $t$.

Then $$\text{radius of wheels } r \text{ and } s = \frac{\theta}{2} = x$$

$$\text{radius of wheel } v = \frac{2\theta}{5} = y$$

and the force of the drive against its resistance is $$z\frac{y}{x} = \frac{z\frac{2\theta}{5}}{\frac{\theta}{2}} = \frac{4}{5}z$$

or 80% of the driving force; but this amount would be higher than 80% on account of the frictional resistance to the rotation of member $i$.

It is obvious that the portion of the driving force (not considering friction) that acts on the resistance to the drive depends on the ratio of the diameter of the wheels $r$ and $v$.

It is also obvious that the mechanism would not return of its own accord to the high speed condition until the resistance to the drive was substantially equal to that portion of the driving force transmitted to the member receiving the resistance. But once in the high speed condition the full driving effort (not considering friction) would be applied against the resistance to the drive. It is well known that this bringing of the mechanism to the high speed condition could be accelerated in a moving automobile by momentarily closing the throttle and allowing the speed of the engine to become substantially the same as the propeller shaft of the vehicle, this being brought about by the momentum of the vehicle.

The main feature of the operation of the portion of the device just described, is that the driving force transmitted by friction wheel *r* continually tends to drive wheel *s* in the opposite direction to which it is rotating and that this force is transmitted through member *i* and wheel *u*, and operates against the resistance. The driving force, tending to drive wheels *u* and *s* in an opposite direction to that in which they are revolving, causes wheel *v* to rotate part of the way with wheel *r*, or at a lower speed than wheel *r*, depending on how much greater the resistance is than the driving force.

In other words wheel *r*, through wheel *s*, shaft *t* and wheels *u* and *v*, continually tends to drive member *i* in the opposite direction to the drive; while the resistance, offered by wheel *v*, through wheel *u*, shaft *t* and wheels *s* and *r* continually tends to drive the member *i* in the direction of the drive. Thus it is obvious that that part of the force of the drive that reaches the wheel *v* continually acts against the resistance to the drive regardless of the difference in speed between member *i* and the drive. This is true when the low-speed condition exists.

Referring now to Figs. 3 to 7 inclusive, 11 denotes a driving shaft receiving power from any suitable source, said shaft being journaled in bearings 12 and 12′. Bearing 12 is fixed, while bearing 12′ comprises the sleeve of a member 13, which constitutes the driven member, and is adapted to deliver power to the mechanism to be driven, said member itself being journaled in a fixed bearing 14. Shaft 11 has secured thereto a ratchet 15 which is adapted to engage a pawl 16 (see Figs. 3 and 4) pivotally mounted on a disk 17 which encircles and is keyed to the hub of a gear 18 loosely mounted on the shaft 11. The pawl 16 is held in engagement with the ratchet 15 by a spring 19. The pawl 16 and ratchet 15 constitute a simple form of one-way driving connection or over-running clutch of which any other suitable and well-known form may be used. Gear 18 meshes with a gear 20 secured to one end of a shaft 21 journaled in a rotary member 22, which is loosely mounted on shaft 11 and constitutes an equalizer or differential element. Secured to the other end of shaft 21 is a dog 23 which is adapted as shown to engage one of an annular series of pins 24 forming part of a wheel 25 (see Figs. 3 and 5) which is loosely mounted on shaft 11 but is locked to the sleeve 12′ of the driven member 13 previously referred to. The dog 23 is provided with a lug 26, on the inner face of the hub thereof, which extends into a notch 10 formed in the rotary member 22 (see Figs. 3 and 6). This construction permits a movement of the dog 23 relative to the rotary member 22 for a purpose to be hereinafter described. The dog 23 is normally held in engagement with one of the pins 24 by a coiled spring 27 one end of which is attached to the rotary member 22 and the other end of which is secured to the hub of said dog. Gears 18 and 20 are preferably of the same pitch diameter, which diameter is preferably equal to the diameter of a circle passing through the centers of the pins 24.

The mechanism so far described constitutes that portion of the device which transmits the highest speed to the driven member 13. The operating principle was clearly described with reference to the diagram shown in Fig. 1. In actual operation with power applied to shaft 11 to rotate said shaft in the direction of the arrow thereon, and the driven member 13 offering less resistance than the force of the drive, the ratchet 15 will be rotated in the direction of the arrow indicated thereon. Through pawl 16 and disk 17, gear 18 will be rotated in the same direction. Gear 18, through gear 20, will rotate member 22 in the same direction, and member 22 through dog 23 will rotate the wheel 25 and consequently the driven member 13 in the same direction. All of the above mentioned parts will be locked together and the entire mechanism will rotate as a unit with the drive, and there will be no relative movement of the parts.

When the high-speed condition exists, on account of the equal diameters of the effective portions of gear 18 and wheel 25, or in other words due to the equal leverages of gears 18 and 20, dog 23 and wheel 25, the resisting force must be greater than the force of the drive before the dog 23 begins to be disengaged from the wheel 25. Since driving gear 18, through gear 20 and shaft 21, tends to drive member 22 in the opposite direction to the drive, and since the resistance of the wheel 25 is not greater than the force of the drive, the entire mechanism revolves as a unit and there is a balance of forces. But, as was previously stated, the leverages are equal, so that if the resisting force is greater than the driving force, this resistance, through wheel 25, always tending to drive member 22 in the direction of the drive, now has its opportunity to actually accomplish this result by partially rotating the dog 23. We now have an unbalanced condition of the forces and the high-speed portion of the mechanism ceases to function.

Figure 3:
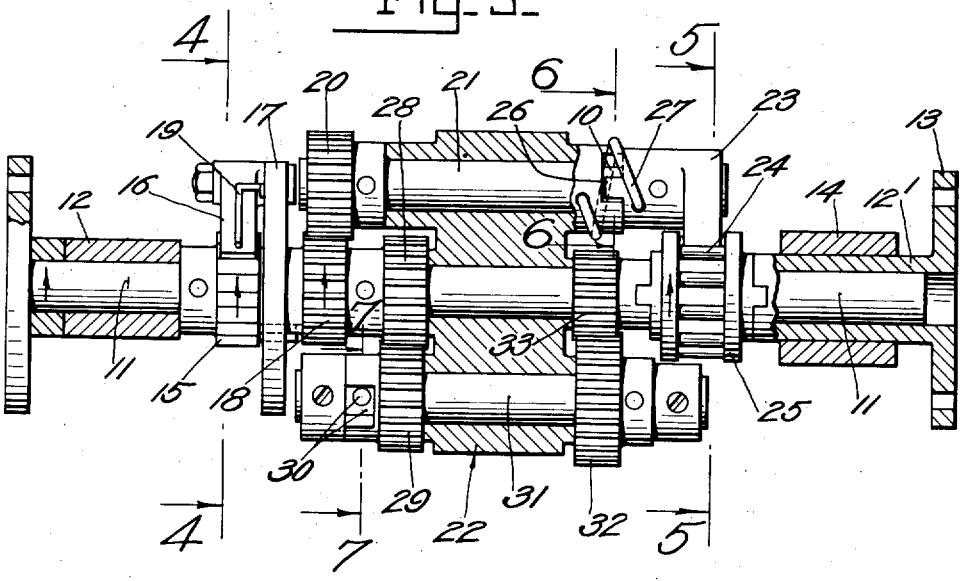
Fig. 3 is a plan view partly in section of a change-speed mechanism constructed and operating in accordance with said principles.
Figure 4:
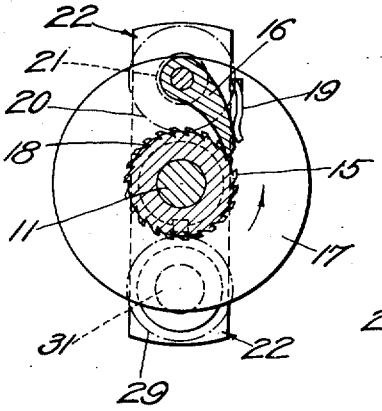
Fig. 4 is a section taken on line 4—4 of Fig. 3.
Figure 7:
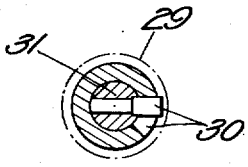
Fig. 7 is a section taken on line 7—7 of Fig. 3.
Figure 5:
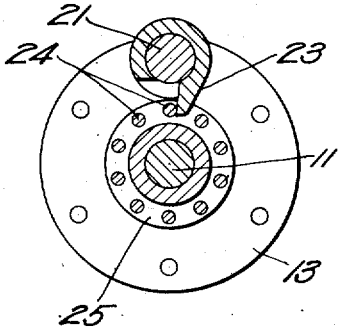
Fig. 5 is a section taken on line 5—5 of Fig. 3.
Figure 6:
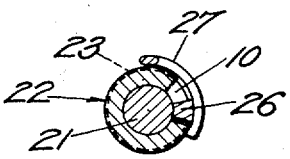
Fig. 6 is a section taken on line 6—6 of Fig. 3.

The mechanism which transmits speeds lower than the high-speed to the driven member 13 will now be described. Secured to the shaft 11 is a gear 28 which meshes with a gear 29 secured by a pin and slot connection 30 to one end of a shaft 31 journaled in the rotary member 22 previously referred to at a point diametrically opposite the shaft 21 therein. Secured to the other end of shaft 31 is a gear 32 which meshes with a gear 33 loosely mounted on the driving shaft 11 but locked to the wheel 25 as shown in Fig. 3. Gears 28 and 29 are preferably of the same pitch diameter while gear 32 is of a greater pitch diameter than gear 33.

In the operation of this portion of the device, the principle of which was clearly described with reference to the diagram shown in Fig. 2, it must be understood, as was previously stated, that the resistance of the driven member 13 has reached a point where it is greater than the force of the drive. The operation of the device thereafter is as follows: Due to the resistance of the driven member 13 and consequently of the wheel 25, the dog 23 is turned through a partial rotation in a counterclockwise direction, as viewed in Fig. 5, which partially rotates shaft 21 and gear 20 in the same direction, thus causing the member 22 to rotate at a faster rate of speed than the drive. Dog 23 continues to rotate on its axis until it is released from the pin 24 with which it was engaged. The notch 10 is provided to limit the movement of dog 23, said notch being adapted to permit sufficient movement of the dog 23 to release it from engagement with the pins 24. After this action has taken place the pawl 16 passes over ratchet 15 and gears 18 and 20 have no relative movement. While the dog 23 is being disengaged, the gear 29, revolving bodily around the shaft 11 at a greater rate of speed than said shaft, has a rotative movement on the shaft 31. Gears 32 and 33, due to their difference in ratio as compared to gears 29 and 28, and depending on the amount of movement of gear 33, may or may not have driven shaft 31 as fast as gear 29 has rotated on said shaft. This possible movement of gear 29 relative to the shaft 31 has been permitted by the slot and pin connection 20 between said gear and said shaft. Gear 28 then takes up the drive and, due to the resistance of the driven member 13, which at this time exceeds the force of the drive, gears 29 and 32 and shaft 31 are revolved bodily about the axis of shaft 11, and consequently member 22 is rotated in a counterclockwise direction and at a rate of speed greater than the drive. Member 22 rotating faster than the drive carries gears 29 and 32 around gears 28 and 33 and imparts some movement to gear 33 in the direction of the drive. Gear 33, which is locked to the wheel 25, which in turn is locked to the driven member 13, imparts this movement to said driven member.

The mechanism above described is particularly adapted for use as a transmission in light passenger cars. No reverse gears are shown as the reversing of the vehicle may be accomplished by an ordinary reverse gear set operated manually.

In the operation of the device above described as applied to a motor vehicle, the operator has only to throw the clutch into engagement to start the vehicle. This operation starts shaft 11 rotating in a counterclockwise direction as viewed from the left of Fig. 3. Shaft 11 drives ratchet 15 which through pawl 16 drives gear 18 in the same direction. Gear 18 rotates member 22 on shaft 11 in the same direction and due to the resistance of wheel 25, which is stationary due to the inertia of the vehicle, dog 23 starts to rotate on its axis and transmits this movement to gear 20, causing member 22 to rotate at a faster rate of speed than the drive. This action continues until the dog 23 has been disengaged from the pin 24 of the wheel 25 with which it was engaged. After this has occurred gear 28 takes up the drive and, due to the resistance, which at this time exceeds the force of the drive, gears 29 and 32 and shaft 31 are revolved bodily about the shaft 11 causing member 22 to rotate in the same direction but at a greater rate of speed than the drive. Member 22, rotating faster than the drive, imparts some movement to gear 33 and, through wheel 25 and driven member 13, starts the car in motion. As the car moves along and the resistance decreases, the speed of the member 22 decreases and continues to decrease, with a corresponding increase in the speed of rotation of the driven member, until the resistance equals the force of the drive applied to gear 33 at which time the dog 23 is partially rotated to again engage the wheel 25, after which the mechanism revolves as a unit and the car is driven at high speed.

It will therefore be seen that the construction described provides a transmission which includes means, automatically controlled by the resistance of the driven element, for driving the latter at a speed which is substantially directly proportional to the speed of the driving element and the force exerted thereby and substantially inversely proportional to the resistance of the driven element.

The mechanism shown in Fig. 3 is preferably driven from the end described, but may be reversed and driven from the opposite end. In this case the member 22, in the low-speed condition, would rotate in the same direction but slower than the drive for some of the lower speeds, be stationary for one speed, and rotate in an opposite direction to the drive for the remainder of the lower speeds. From the performance of member 22 under these conditions, it is obvious that the mechanism would not return to the high-speed condition as quickly as if it was driven in the manner shown, in which case member 22 has to slow down to come into the high-speed condition, it being easier to decelerate a rotating body than accelerate it.

Figure 8:
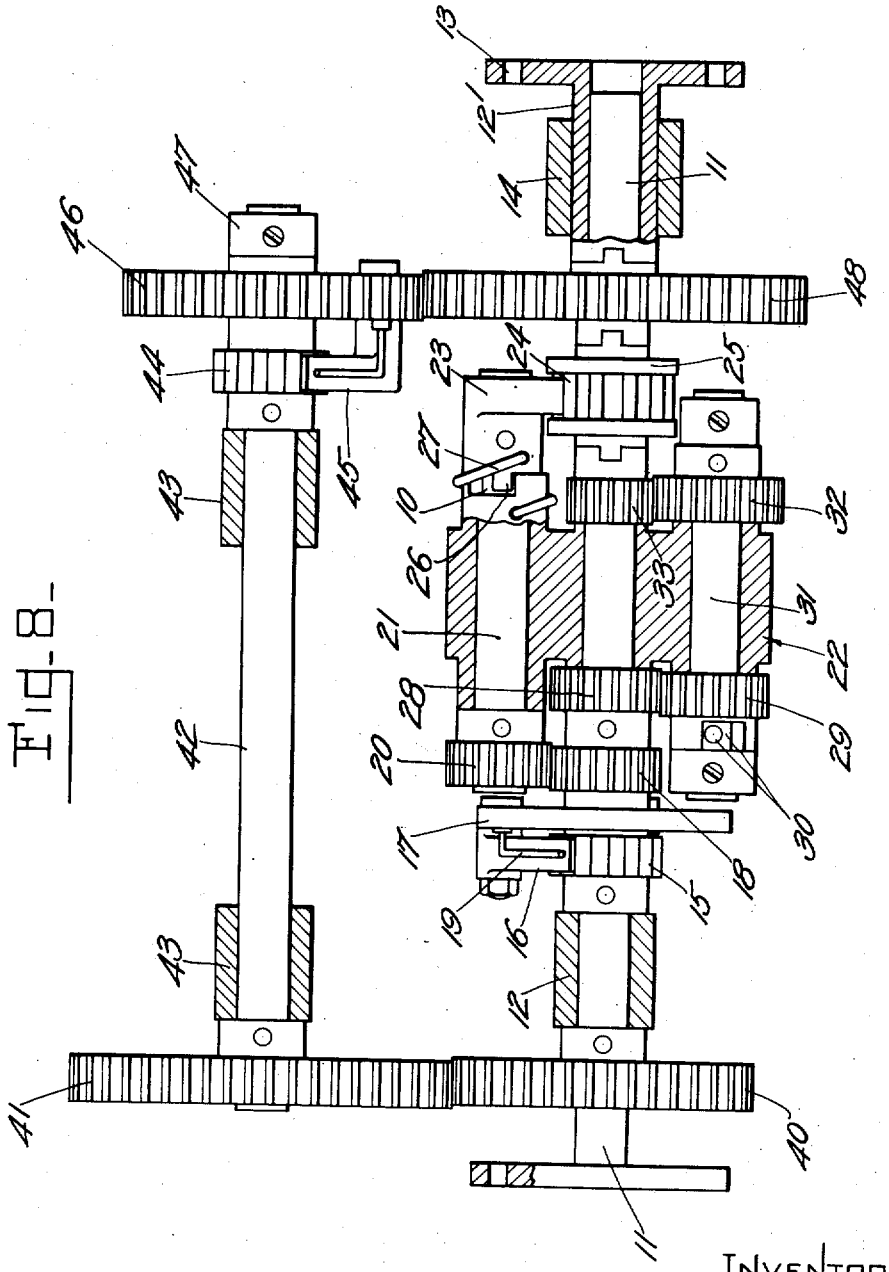
Fig. 8 is a view similar to Fig. 3 showing a modified construction.
Figure 5:
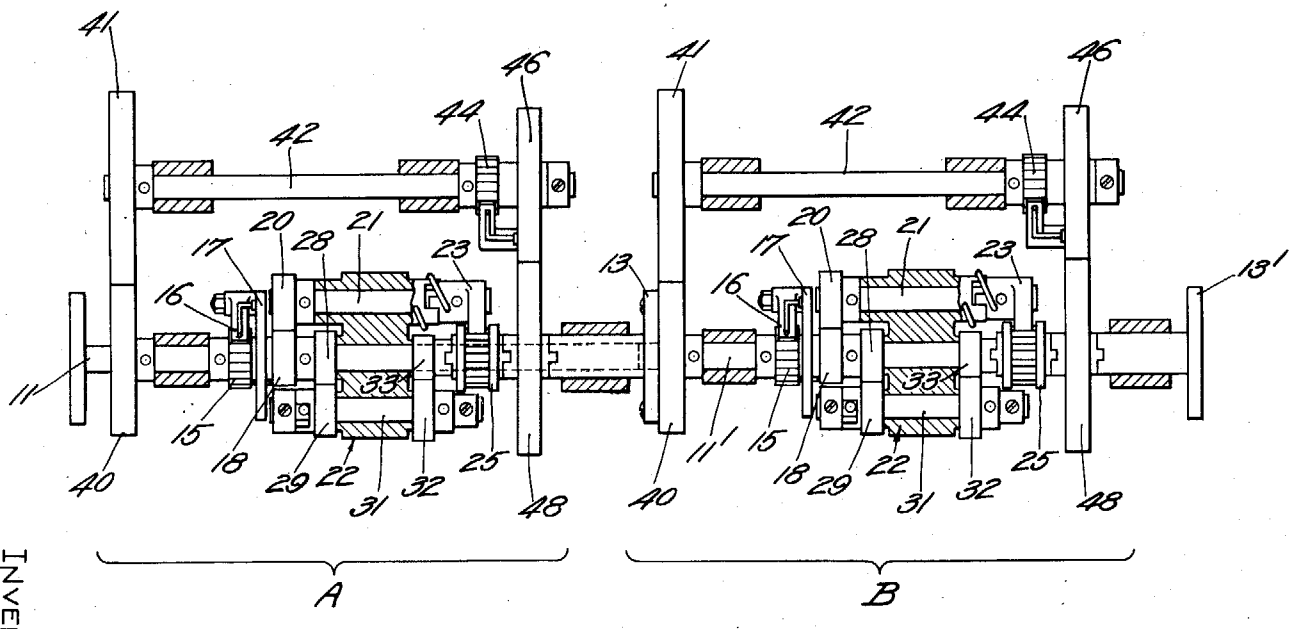

In Fig. 8 is shown a modified construction in which a definite low speed may be attained. The high-speed portion of this device is similar to that shown in Fig. 3 with the exception of the addition of a gear 48 to be hereinafter described, and its parts have been designated by the same reference characters. The gear 48 is loosely mounted on the shaft 11 and is interposed between the wheel 25 and the driven member 13, being locked to each of said parts. The operation of this portion of the device is identical with that described in connection with the high-speed mechanism shown in Fig. 3. The low-speed portion of this device is similar to that shown in Fig. 3, with the exception of the gear 48 above noted, for a definite range of speeds lower than the high speed and down to a speed where the resistance has increased to a predetermined point. The parts of this portion of the device have been designated with the same reference characters of similar parts in Fig. 3. When the resistance to the drive has increased to a predetermined amount, the drive is through mechanism which will now be described. Secured to shaft 11, adjacent the bearing 12, is a gear 40 which meshes with a gear 41 secured to one end of a counter-shaft 42 which is journaled in fixed bearings 43. Secured to the other end of the counter-shaft 42 is a ratchet 44 (or equivalent one-way driving connection) which is engaged by a spring-pressed pawl 45 pivotally mounted on a gear 46 which is itself loosely mounted on said shaft and held in place thereon by a collar 47. The gear 46 meshes with the gear 48 above described. The pitch diameter of the gear 41 is preferably greater than that of the gear 40 with the result that the counter-shaft 42 is driven at a slower rate of speed than the drive.

The operation of the mechanism shown in Fig. 8 may be briefly stated as follows: When the force of the driving shaft 11 exceeds the resistance of the driven member 13, the drive will be through the high-speed portion of the mechanism in a similar manner to that described in reference to Fig. 3. At this time the gear 48 will be rotating at the same speed and in the same direction as the drive. Due to the fact that the counter-shaft 42 is rotating at a slower rate of speed than the drive and also to the ratio of the gears 48 and 46, the gear 46 will be rotated by the gear 48 at a greater rate of speed than might be imparted to it by the drive, and the gear 46 will, therefore, rotate idly on the shaft 42 with the pawl 45 passing freely over the ratchet 44. When the resistance of the driven member 13 has increased to a point just beyond the force of the driving shaft 11, the high-speed portion will be thrown out of operation as described with reference to Fig. 3 and the drive will be through the parts of the low-speed portion of the device which correspond to the low-speed portion shown in Fig. 3. At this time the gear 48 will still be rotating the gear 46 at a greater rate of speed than might be imparted to it by the drive and will continue to do so until the resistance of the driven member 13 has increased to a predetermined point, determined by the ratio of the gears 40 and 41 and the ratio of the gears 48 and 46. At this time, due to the ratio of the above described train of gears, the gear 46 will be driven by the shaft 11 through the gears 40, and 41 and the ratchet 44 and pawl 45 at a greater speed than the gear 48 tends to drive it. It will thus be seen that a definite low speed has been reached, the drive at this time being through shaft 11, gears 40 and 41, ratchet 44 and pawl 45, gears 46 and 48 and driven member 13.

The mechanism just described is particularly adapted for use as a transmission in heavy passenger cars and small trucks.

Fig. 9 shows a transmission in which two sets of mechanism as disclosed in Fig. 8 are joined together.

For convenience the set adjacent the source of power is designated as a whole by the reference character A, while the other set is designated by the reference character B. Similar parts are designated by the same reference characters used in Fig. 8, with the exception of the driving shafts which are designated 11 and 11′, and the driven members which are designated 13 and 13′ for set A and set B respectively. The driven member 13 of set A is secured to the gear 40 of set B for rotation with said gear and consequently with the shaft 11′.

The operation of the complete device shown in Fig. 9 may be briefly stated as follows: When the resistance of the driven member 13′ is less than the force of the driving shaft 11, the drive is through the high speed portions of sets A and B, the gear trains of both sets idling because the gears 48 will be rotating the gears 46 at a greater rate of speed than the gears 40 tend to rotate them. This constitutes the high-speed condition. When the resistance of the driven member 13′ increases to a point sufficiently beyond the force of the drive, the drive is through the low-speed portion of one set and the high-speed portion of the other set, the gear trains of both sets not functioning at this time. When the resistance to the drive is increased to a predetermined point, the train of gears of that set which was operating in low-speed takes up the drive. This condition constitutes a definite intermediate speed. If the resistance is sufficiently further increased, the set that was operating in high-speed now operates in low-speed exclusive of its gear train, and, with a further increase in resistance, said set operates through its gear train which results in a definite low-speed. It will thus be seen that, with two sets of mechanism joined together, three definite speeds may be attained. With three sets, four definite speeds may be attained, and so on. The above described mechanism is particularly adapted for use as a transmission in large trucks, buses and machines where a number of definite speeds are required.

I claim:

1. The combination of a driving element, a driven element, and a change-speed mechanism connecting said elements including an equalizing element, a shaft journalled in said last named element, operating connections between said driving element and said shaft, and operating connections, automatically controlled by the resistance of said driven element and including a releasable driving connection between said shaft and said driven element, whereby the latter may be driven when said resistance is not greater than the force exerted by said driving element.

2. The combination of a driving element, a driven element, and a change-speed mechanism connecting said elements including an equalizing element, a shaft journalled in said last named element, a one-way driving connection between said driving element and said shaft, a releasable driving connection, automatically controlled by the resistance of said driven element, between said shaft and driven element whereby the latter may be driven when its resistance is not greater than the force of said driving element and a second shaft journalled in said equalizing element and having operative connections with said driving element and said driven element whereby the latter may be driven when said releasable driving connection is released.

3. The combination of a driving element, a driven element, an equalizing element mounted to rotate about the axis of the driving element, a shaft journalled in said equalizing element, a dog fast on said shaft, a circular series of stops connected with said driven element and engaged by said dog, a gear fast on said shaft, a second gear loose on said driving element and meshing with said first-named gear, a one way driving connection between said driving element and said second gear, a second shaft journalled in said equalizing element, a third gear on said second shaft, a fourth gear meshing with said third gear and loose on said driving element but connected with said driven element for rotation therewith, a fifth gear having a limited rotary movement on said second shaft, and a sixth gear fast upon said driving element and meshing with said fifth gear.

4. The combination of a driving element, a driven element, an equalizing element mounted to rotate about the axis of the driving element, a shaft journalled in said equalizing element, a dog fast on said shaft, a circular series of stops connected with said driven element and engaged by said dog, a gear fast on said shaft, a second gear loose on said driving element and meshing with said first-named gear, a one way driving connection between said driving element and said second gear, a second shaft journalled in said equalizing element, a third gear on said second shaft, a fourth gear relatively smaller than said third gear and meshing therewith, said fourth gear being loose on said driving element but connected with said driven element for rotation therewith, a fifth gear having a limited rotary movement on said second shaft, and a sixth gear fast upon said driving element and meshing with said fifth gear.

5. The combination of a driving element, a driven element, change-speed gearing connecting said elements and including means controlled by the resistance of said driven element when said resistance is less than a predetermined limit, for driving the said driven element at a speed substantially inversely proportional to said resistance, and additional means for automatically driving said driven element at a constant speed when said resistance is greater than said limit, said last-named means comprising a countershaft and intermeshing gears connecting said countershaft with said driving and driven elements, there being a one-way driving connection between one of said gears and the part by which it is carried.

6. The combination of a driving element, a driven element, and change speed mechanism for connecting said elements for driving the driven element at a constant high speed ratio, at a constant low speed ratio, and at intermediate speed ratios, said mechanism including a torque balancing power transmitting member movable with said driving and driven elements and also relative thereto at variable speed, said mechanism also including means controlled by the torque ratio of said elements and connecting said torque balancing member therewith for controlling the relative speed of said elements and member in accordance with said ratio.

7. The combination of a driving element, a driven element, and change speed mechanism for connecting said elements for driving the driven element at different speed ratios with respect to the driving element, said mechanism comprising means for driving said driven element at a constant intermediate speed ratio including a countershaft, intermeshing gears connecting said countershaft with said driving element, and other intermeshing gears constituting, at least in part, the driving connection between said countershaft and the driven element, there being a one-way driving connection between one of said gears and the member by which it is carried.

8. The combination of a driving element, a driven element, and change speed mechanism for connecting said elements for driving the driven element at different speed ratios with respect to the driving element, said mechanism comprising means for driving said driven element at a constant low speed ratio including a countershaft, intermeshing gears connecting said countershaft with said driving element, and other intermeshing gears constituting, at least in part, the driving connection between said countershaft and the driven element, there being a one-way driving connection between one of said gears and the member by which it is carried.

9. The combination of a driving element, a driven element, and a change-speed mechanism connecting said elements and including means for driving said driven element indirectly from said driving element, said means including, in combination, a torque balancing power transmitting member movable continuously relatively to the said driving and driven elements when said elements are indirectly connected, and means controlled by the torque ratio of said elements and connecting said torque balancing member therewith for controlling the relative speed of said elements and member in accordance with said ratio.

10. The combination of a driving element, a coaxial driven element, a torque balancing power transmitting member mounted to rotate about the common axis of the driving and driven elements and movable with said elements and relatively thereto at variable speed, and transmission elements carried by said torque balancing member and connecting said driving and driven elements, said torque balancing member moving continuously relatively to said driving and driven elements when said driving and driven elements are indirectly connected by said transmission elements.

11. The combination of a driving element, a driven element, means for driving said driven element at substantially the same speed as that of said driving element, said means including a torque balancing power transmitting member movable relatively to said driving and driven elements and controlled by the torque ratio thereof for movement relative to said driving element, for disconnecting said driving means, and means cooperating with said member rendered operative when said driving means is disconnected for driving said driven element from said driving member at a reduced speed, said torque balancing member moving continuously relatively to said driving and driven elements after said speed reduction is established.

12. The combination of a driving element, a driven element, means for driving said driven element at substantially the same speed as that of said driving element, said means including a torque balancing power transmitting member movable relatively to said driving and driven elements and controlled by the torque ratio thereof for movement relative to said driving element, for disconnecting said driving means, means cooperating with said members rendered operative when said driving means is disconnected for driving said driven element from said driving member at a reduced speed, and additional means to limit the reduction of said speed, said torque balancing member moving continuously relatively to said driving and driven elements after said speed reduction is established.

13. The combination of an initial driving element, a final driven element, and a plurality of change-speed mechanisms arranged in succession connecting said elements and each including in combination, a driving and driven member, means connecting said members for driving said driven member directly and indirectly from said driving member, said means including, in combination, a torque balancing power transmitting member movable continuously relatively to the said driving and driven members when said members are indirectly connected, and means controlled by the torque ratio of said driving and driven members and connecting said torque balancing member therewith for controlling the relative speed of said driving and driven members and said torque balancing member in accordance with said ratio.

14. The combination of an initial driving element, a final driven element, and a plurality of change-speed mechanisms arranged in succession connecting said elements and each including in combination, a driving and driven member, means connecting said members for driving said driven member directly and indirectly from said driving member, said means including, in combination, a torque balancing power transmitting member movable continuously relatively to the said driving and driven members when said members are indirectly connected, and means controlled by the torque ratio of said driving and driven members and connecting said torque balancing member therewith for controlling the relative speed of said driving and driven members and said torque balancing member in accordance with said ratio, and means to limit the speed reduction in each of said mechanisms.

15. The combination of a driving element, a driven element, and a change-speed mechanism connecting said elements and including means for driving said driven element directly or indirectly from said driving element, said means including, in combination, a torque balancing power transmitting member movable with said driving and driven elements when said elements are directly connected, said torque balancing member moving continuously relatively to said driving and driven elements when said elements are indirectly connected, and means controlled by the torque ratio of said elements and connecting said torque balancing member therewith for controlling the relative speed of said elements and member in accordance with said ratio.

16. The combination of a driving element, a driven element, means for driving said driven element at substantially the same speed as that of said driving element including a torque balancing power transmitting member movable relatively to said driving and driven elements and controlled by the torque ratio thereof for movement relative to said driving element for disconnecting said driving means, and means cooperating with said member rendered operative when said driving means is disconnected for driving said driven element from said driving element at a reduced speed, said torque balancing member moving continuously relatively to said driven element after said speed reduction is established.

17. The combination of an initial driving element, a final driven element, and a plurality of change-speed mechanisms arranged in succession connecting said elements and each including, in combination, a driving and driven member, means for driving said driven member at substantially the same speed as that of said driving member including a torque balancing power transmitting member movable relatively to said driving and driven members and controlled by the torque ratio thereof for movement relative to said driving member for disconnecting said driving means, and means cooperating with said member rendered operative when said driving means is disconnected for driving said driven member from said driving member at a reduced speed, said torque balancing member moving continuously relatively to said driving and driven members after said speed reduction is established.

18. The combination of an initial driving element, a final driven element, and a plurality of change-speed mechanisms arranged in succession connecting said elements and each including, in combination, a driving and driven member, means for driving said driven member at substantially the same speed as that of said driving member, including a torque balancing power transmitting member movable relatively to said driving and driven members and controlled by the torque ratio thereof for movement relative to said driving member for disconnecting said driving means, and means cooperating with said member rendered operative when said driving means is disconnected for driving said driven member from said driving member at a reduced speed, said torque balancing member moving continuously relatively to said driven member after said speed reduction is established.

19. The combination of a driving element, a driven element, a rotatable torque receiving member, means for providing a driving connection between said member and said elements adapted to transmit opposed forces to said member, one of said forces acting to disconnect said driving connection and including a force responsive to the torque of said driven element, the other of said forces acting to maintain said driving connection and including a force responsive to the torque of said driving element, whereby said member is rotated to disconnect said driving connection in response to the resultant force created when said force including that responsive to the torque of the driven element exceeds the other of said opposed forces.

20. The combination of a driving element, a driven element, means for providing driving connections between said elements to drive said driven element at different speed ratios with respect to said driving element, one of said driving connections including a rotatable torque receiving member and means for providing a driving connection between said member and said elements, said last mentioned means being adapted to transmit opposed forces to said member, one of said forces acting to disconnect said driving connection and including a force responsive to the torque of said driven element, the other of said forces acting to maintain said driving connection and including a force responsive to the torque of said driving element, whereby said member is rotated to disconnect said driving connection in response to the resultant force created when said force including that responsive to the torque of the driven element exceeds the other of said opposed forces.

21. The combination of a driving element, a driven element, means for providing driving connections between said elements to drive said driven element at different speed ratios with respect to said driving element, one of said driving connections including a rotatable torque receiving member and means for providing a driving connection between said member and said elements, said last mentioned means being adapted to transmit opposed forces to said member, one of said forces acting to disconnect said driving connection and including a force responsive to the torque of said driven element, the other of said forces acting to maintain said driving connection and including a force responsive to the torque of said driving element, whereby said member is rotated to disconnect said driving connection in response to the resultant force created when said force including that responsive to the torque of the driven element exceeds the other of said opposed forces, another of said driving connections operating independently of said torque receiving member.

22. The combination of a driving element, a driven element, means providing driving connections between said elements to drive said driven element at different speed ratios with respect to said driving element, at least two of said driving connections each including a separate rotatable torque receiving member and separate means for providing a driving connection between the same and said elements, each of said last mentioned means being adapted to transmit opposed forces to one of said members, one of said forces acting to disconnect said driving connection and including a force responsive to the torque of said driven element, the other of said forces acting to maintain said driving connection and including a force responsive to the torque of said driving element, whereby said member is rotated to disconnect said driving connection in response to the resultant force created when said force including that responsive to the torque of the driven element exceeds the other of said opposed forces.

23. The combination of a driving element, a driven element a rotatable torque receiving member, means for providing a driving connection between said member and said elements adapted to transmit opposed forces to said member, one of said forces acting to disconnect said driving connection and including a force responsive to the torque of said driven element, the other of said forces acting to maintain said driving connection and including a force responsive to the torque of said driving element, whereby said member is rotated to disconnect said driving connection in response to the resultant force created when said force including that responsive to the torque of the driven element exceeds the other of said opposed forces, said resultant force acting to rotate said member continuously after said driving connection has been rendered inoperative.

In testimony whereof I affix my signature.

CARROLL H. RICHARDS.